(12) United States Patent
Yao et al.

(10) Patent No.: US 12,127,221 B2
(45) Date of Patent: Oct. 22, 2024

(54) TECHNIQUES IN MULTICAST AND BROADBAND SERVICES (MBS) HARQ FEEDBACK

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haitong Sun, Irvine, CA (US); Haijing Hu, Beijing (CN); Hong He, Cuertino, CA (US); Huaning Niu, San Jose, CA (US); Fangli Xu, Beijing (CN); Oghenekome Oteri, San Diego, CA (US); Seyed Ali Akbar Fakoorian, San Diego, CA (US); Sigen Ye, Whitehouse Station, NJ (US); Wei Zeng, San Diego, CA (US); Yuqin Chen, Shenzhen (CN); Yushu Zhang, Beijing (CN); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 17/439,010

(22) PCT Filed: Oct. 15, 2020

(86) PCT No.: PCT/CN2020/121117
§ 371 (c)(1),
(2) Date: Sep. 14, 2021

(87) PCT Pub. No.: WO2022/077327
PCT Pub. Date: Apr. 21, 2022

(65) Prior Publication Data
US 2022/0303948 A1 Sep. 22, 2022

(51) Int. Cl.
*H04W 72/30* (2023.01)
*H04L 1/08* (2006.01)
(Continued)

(52) U.S. Cl.
CPC ............... *H04W 72/30* (2023.01); *H04L 1/08* (2013.01); *H04L 5/0055* (2013.01); *H04W 72/21* (2023.01)

(58) Field of Classification Search
None
See application file for complete search history.

(56) References Cited

U.S. PATENT DOCUMENTS 10,105,608 B1 * 10/2018 George ................. A63F 13/211
11,844,095 B2 * 12/2023 Lee ....................... H04L 1/1812
(Continued)

FOREIGN PATENT DOCUMENTS

| CN | 101883325 A | 11/2010 |
|---|---|---|
| CN | 102144414 A | 8/2011 |

(Continued)

OTHER PUBLICATIONS

International Search Report for PCT Patent Application No. PCT/CN2020/121117; mailed Jul. 21, 2021.
(Continued)

*Primary Examiner* — Hassan A Phillips
*Assistant Examiner* — Gautam Sharma
(74) *Attorney, Agent, or Firm* — Kowert, Hood, Munyon, Rankin & Goetzel, P.C.

(57) ABSTRACT

This disclosure relates to apparatuses and methods for providing and managing reception feedback for multicast and broadcast services (MBS). A base station (BS) may select and communicate, to a group of user equipment devices (UEs), configuration parameters for MBS communications, such as an indication of an MBS retransmission
(Continued)

procedure for an MBS service. The BS may also transmit, to the group of UEs, an MBS data communication. A first UE may receive the MBS data communication, but may determine that the received MBS data communication is corrupted. The first UE may respond by transmitting, to the BS, a negative-acknowledgement (NACK) message. The BS may retransmit the MBS data communication either as an MBS transmission or as a unicast transmission, based on the configuration parameters. The first UE may monitor the appropriate resources to receive the retransmitted MBS data communication, based on the configuration parameters.

16 Claims, 4 Drawing Sheets

(51) Int. Cl.
*H04L 5/00* (2006.01)
*H04W 72/21* (2023.01)

(56) References Cited

U.S. PATENT DOCUMENTS

| | | | |
|---|---|---|---|
| 2005/0058116 A1* | 3/2005 | Palin | H04L 1/18 370/345 |
| 2005/0268210 A1* | 12/2005 | Ashley | G11B 20/18 |
| 2007/0281726 A1* | 12/2007 | Rey | H04L 12/1868 455/522 |
| 2008/0256409 A1 | 10/2008 | Oran | |
| 2013/0136053 A1* | 5/2013 | Kim | H04L 27/2626 370/312 |
| 2015/0201388 A1* | 7/2015 | Cheng | H04W 52/30 370/329 |
| 2020/0112959 A1* | 4/2020 | Gong | H04L 1/1822 |
| 2021/0126745 A1* | 4/2021 | Kadiri | H04L 1/187 |
| 2022/0132277 A1* | 4/2022 | Shrivastava | H04W 4/06 |
| 2022/0132467 A1* | 4/2022 | Shrivastava | H04W 4/06 |
| 2022/0322293 A1* | 10/2022 | Baek | H04W 72/30 |
| 2022/0360950 A1* | 11/2022 | Li | H04L 1/1812 |
| 2023/0110505 A1* | 4/2023 | Wang | H04L 1/08 370/331 |
| 2023/0133506 A1* | 5/2023 | Wang | H04W 72/23 |
| 2023/0179343 A1* | 6/2023 | Navrátil | H04L 1/1896 370/328 |
| 2023/0403312 A1* | 12/2023 | Oyman | H04L 65/1073 |

FOREIGN PATENT DOCUMENTS

| | | |
|---|---|---|
| EP | 4135397 | 2/2023 |
| WO | 2021076421 | 4/2021 |
| WO | 2021236055 | 11/2021 |

OTHER PUBLICATIONS

ZTE "Mechanisms to Improve Reliability for RRC_connected UEs"; 3GPP TSG RAN WG1 Meeting #102-e; R1-2005437; Aug. 17-28, 2020.
Extended European Search Report for EP Patent Application No. 20957107.4; Apr. 9, 2024.
CMCC "Discussion on reliability improvement in NR MBS"; 3GPP TSG RAN WG1 #102e R1-2006234; Aug. 17, 2020.

* cited by examiner

TECHNIQUES IN MULTICAST AND BROADBAND SERVICES (MBS) HARQ FEEDBACK

PRIORITY CLAIM INFORMATION

This application is a national stage application of International Application No. PCT/CN2020/121117, filed on Oct. 15, 2020, titled " echniques in Multicast and Broadband Services (MBS) HARQ Feedback", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatus, and methods for improving reliability of Multicast and Broadband Services (MBS) communications through reception feedback.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (UPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

One aspect of cellular communication systems involves Multicast and Broadband Services (MBS) communications. Improvements in the field are desired.

SUMMARY

Embodiments are presented herein of apparatus, systems, and methods for reducing latency in a high-propagation-delay wireless communication system through use of reception feedback.

An apparatus is disclosed, including a processor configured to cause a base station to select a retransmission procedure for a multicast and broadcast services (MBS) service, from a plurality of available retransmission procedures. The base station may transmit, to a plurality of UEs, an indication of the selected retransmission procedure, and an MBS data communication for the MBS service. The base station may receive, from a first UE of the plurality of UEs, a negative-acknowledgement (NACK) message responsive to the MBS data communication, and may respond to the received NACK message based on the selected retransmission procedure. When the selected retransmission procedure is a first procedure, responding. to the received NACK message may include retransmitting the MBS data transmission using resources allocated for the MBS service. When the selected retransmission procedure is a second procedure, responding to the received NACK message may include retransmitting the MBS data communication using resources allocated for unicast transmission to the first UE.

In some scenarios, responding to the received NACK message may include: when the selected retransmission procedure is a third procedure, not retransmitting the MBS data communication.

In some scenarios, the NACK message may be received via physical uplink control channel (PUCCH) resources allocated for the MBS service. In some such scenarios, the base station may receive an additional NACK message from a second UE of the plurality of UEs, wherein the additional MACK. message is received via the same PUCCH resources allocated for the MBS service. In some such scenarios, the PUCCH resources may be allocated for MBS reception feedback by a subgroup of the plurality of UEs, wherein the first UE is included in the sub-group.

In some scenarios, the NACK message may be transmitted using PUCCH resources allocated to the first UE for reception feedback for MBS messages received by the first UE.

In some scenarios, the NACK message may be transmitted using PUCCH resources allocated to the first UE for reception feedback for unicast messages received by the first UE.

In some scenarios, the NACK message may be transmitted using a unicast physical uplink shared channel (PUSCH).

In some scenarios, the base station may receive from the UE reception statistics regarding messages associated with the MBS service received by the UE.

In some scenarios, the indication of the selected retransmission procedure may be transmitted is a downlink control indicator (DCI) for MBS data scheduling.

In some scenarios, the indication of the selected retransmission procedure may be transmitted in a medium access control (MAC) control element (CE).

An apparatus is disclosed, including a processor configured to cause a user equipment (UE) to receive, from a base station, an indication of a multicast and broadcast services (MBS) retransmission procedure for an MBS service. The UE may also receive, from the base station, an MBS data transmission, and may transmit, to the base station, a negative acknowledgement (NACK) message in response to determining that reception of the MBS data transmission was corrupted. The UE may monitor for a retransmission of the MBS data transmission responsive to the NACK message. When the indication of the NIBS retransmission procedure has a first value, monitoring for the retransmission may include monitoring resources allocated for MBS communications. When the indication of the MBS retransmission procedure has a second value, monitoring for he retransmission may include monitoring resources allocated for unicast communications to the UE.

In some scenarios, the indication of the MBS retransmission procedure may be received in a downlink control indicator (DCI) for a single cell—multicast traffic channel (SC-MTCH).

In some scenarios, the indication of the MBS retransmission procedure is received in a medium access control (MAC) control element (CE).

In some scenarios, the UE may not transmit an acknowledgement (ACK) message in response to determining that the MBS data transmission was received properly.

In some scenarios, the NACK message may be transmitted using ACK/NACK physical uplink control channel (PUCCH) resources allocated for the MBS service. In some such scenarios, the ACK/NACK PUCCH resources may be allocated for MBS reception feedback by a sub-group of a group of UEs subscribed to the MBS service, wherein the UE is included in the group of UEs.

In some scenarios, the NACK message may be transmitted using ACK/NACK PUCCH resources allocated for reception feedback for MBS messages received by the UE.

In some scenarios, the NACK message may be transmitted using ACK/NACK PUCCH resources configured for reception feedback for unicast messages received by the UE.

In some scenarios, the NACK message may be transmitted using a unicast physical uplink shared channel (PUSCH). In some such scenarios, transmitting the NACK message using the unicast PUSCH may be in response to determining that transmitting the NACK message on ACK/NACK PUCCH resources would conflict in time with the unicast PUSCH.

In some scenarios, the UE may receive an indication that MBS reception feedback is enabled for the MBS service, wherein the transmitting the NACK message is in response to receiving the indication that NIBS reception feedback is enabled.

Systems and methods are also disclosed, having features similar to those outlined above.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
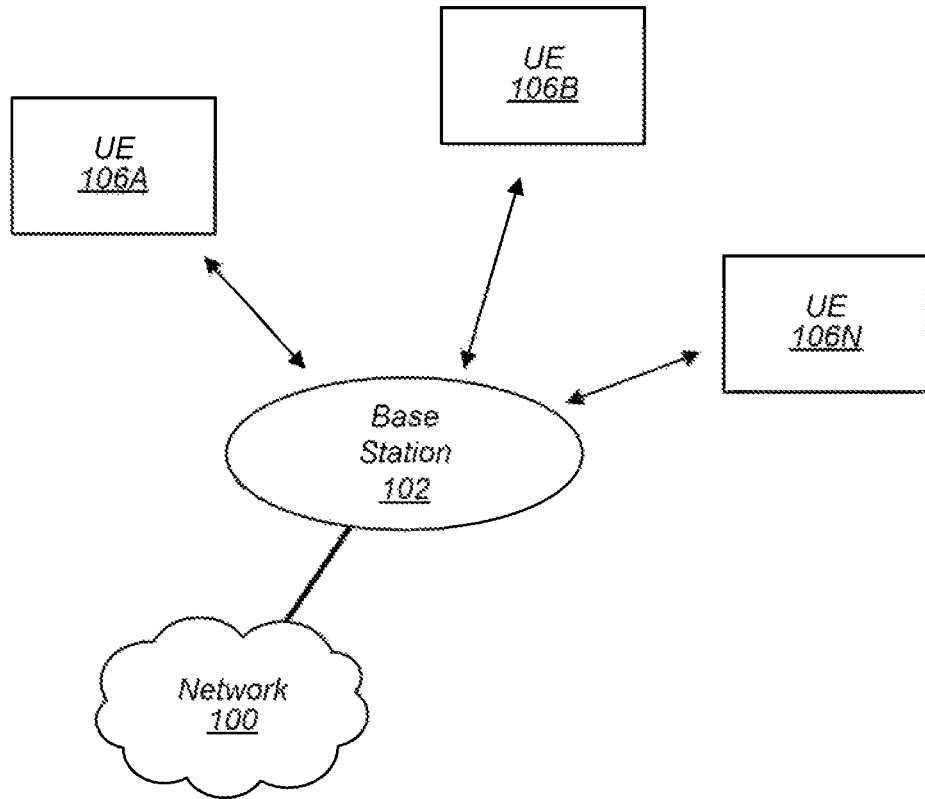
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope or the subject matter as defined by the appended claims.

DETAILED DESCRIPTION

Acronyms

Various acronyms are used throughout the present disclosure. Definitions of the most prominently used acronyms that may appear throughout the present disclosure are provided below:

BS: Base Station
CE: Control Element
DCI: Downlink Control Information
DL: Downlink
GSM: Global System for Mobile Communication
HARQ: Hybrid Automatic Repeat request
IE: information Element
LTE Long Term Evolution
MAC: Medium Access Control
MBS: Multicast and Broadcast Services
MCH: Multicast Channel
NR: New Radio
PDSCH: Physical Downlink Shared Channel
PRACH: Physical Random Access Channel
PUCCH: Physical Uplink Control Channel
PUSCH: Physical Uplink Shared Channel
PTM: Peer-To-Multiple
PTP: Peer-To-Peer
RACH: Random Access Channel
RAT: Radio Access Technology
RF: Radio Frequency
RX: Reception/Receive
SC-MCCH: Single Cell—Multicast Control Channel
SC-MTCH: Single Cell—Multicast Traffic Channel
TX: Transmission/Transmit
UE: User Equipment
UL: Uplink
UMTS: Universal Mobile Telecommunication System Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system., or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Playstation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are as marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g. by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. in such contexts, "configured to" is abroad recitation generally meaning "having structure that" performs the task or tasks during operation. As such, the component can be configured to perform the task. even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
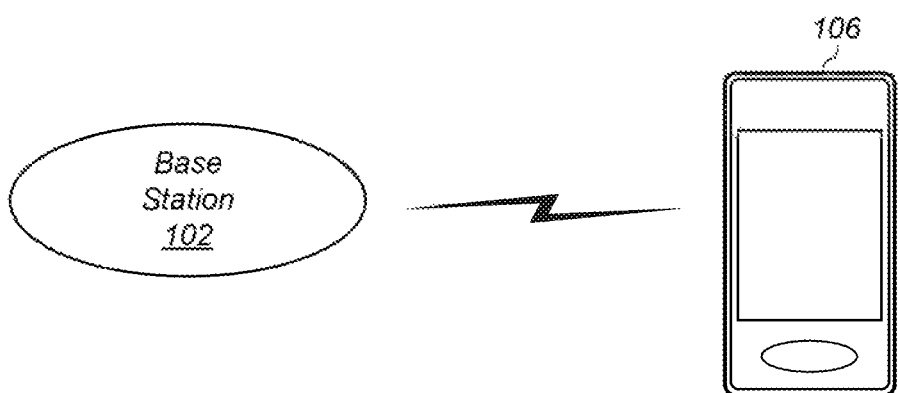
FIG. 2 illustrates an exemplary base station in communication with an exemplary wireless user equipment (UE) device, according to some embodiments.

FIGS. 1 and 2—Exemplary Communication

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices an/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATS), also referred to as wireless communication technologies, or telecommunication standards, such as GSM, UMTS (WCDMA), LTE, LTE-Advanced (LTE-A), LAA/LTE-U, 5G NR, 3GGPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless as communication standards. For example, a UE 106 might be configured to communicate using either or both of a 3GPP cellular communication standard or a 3GPP2 cellular communication standard. In some embodiments, the UE 106 may be configured to perform techniques for reducing latency in a multi-beam wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of Wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using, any of multiple wireless communication protocols. For example, the UE 106 may be configured to communicate using two or more of CDMA2000, LTE, LTE-A, 5G, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1xRTT (or LTE or NR, or LTE or GSM), and separate radios for communicating using each of Wi-Fi and BLUETOOTH™. Other configurations are also possible.

Figure 3:
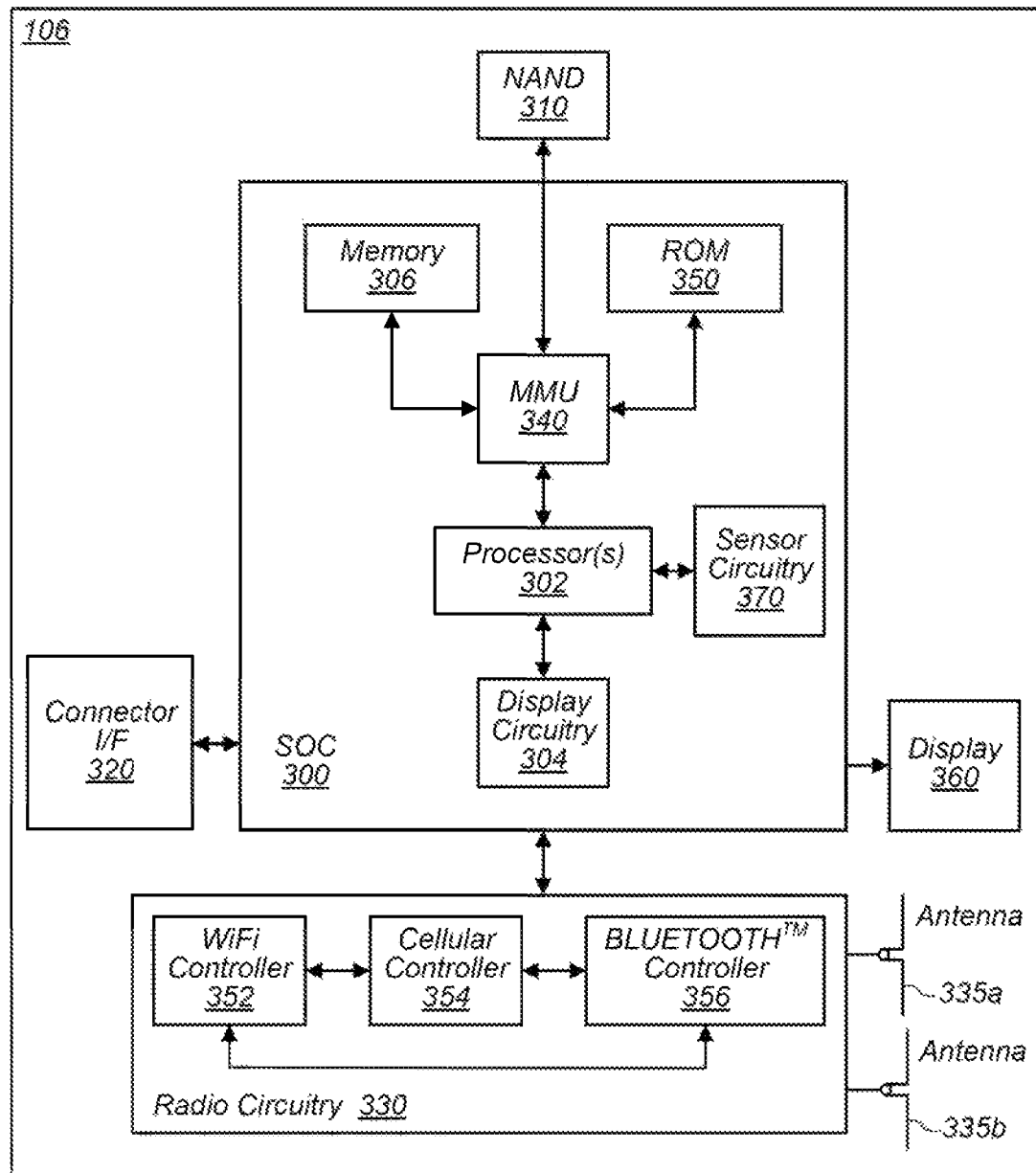
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector interface (1/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and radio circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for improving reliability of Multicast and Broadband Services (MBS) communications, such as described further subsequently herein. The processor(s) 302 of the UE device 106 may be configured to implement part of all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for improving reliability of MBS communications according to various embodiments disclosed herein. Processor(s) 302 may also implement various other applications and/or end-user applications running on UE 106.

In some embodiments, radio circuitry 330 may include separate controllers dedicated to controlling communications for various respective RAT standards. For example, as shown in FIG. 3, radio circuitry 330 may include a Wi-Fi controller 352, a cellular controller (e.g. LTE-A and/or NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™controller 356 may communicate with cellular controller 354 over a cell-ISM link, etc. While three separate controllers are illustrated within radio circuitry 330, other embodiments have fewer or more similar controllers for various different RATS that may be implemented in UE device 106. In some embodiments, the cellular controller 354 may include a baseband processor configured to implement, or to cause the UE 106 to implement, one or more of the procedures disclosed herein, or a portion thereof.

Figure 4:
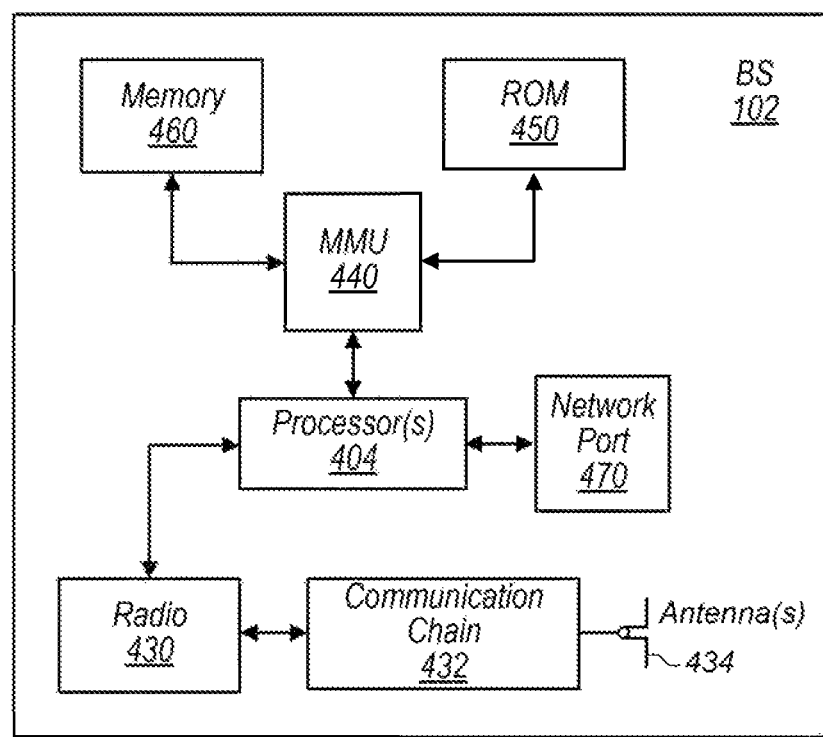
FIG. 4 illustrates an exemplary block diagram of a base station, according to some embodiments.

FIG. 4—Block Diagram of an Exemplary Base Station

FIG. 4 illustrates a block diagram of an exemplary base station 102, according to same embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the Core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

HARQ-ACK for MBS Communications

As cellular spectrum usage increases in density, Multicast and Broadcast Services (MBS) are becoming a more popular solution to increase resource efficiency when a base station has information to communicate to a plurality of UEs. In legacy systems, such as LTE, MBS communications do not utilize reception feedback, such as transmission of an ACK/NACK signal. However, as MBS is becoming more common, there is a desire to improve reliability of MBS communications, which may be achieved in part through use of such reception feedback. Because MBS communications are intended to include a plurality of recipients, providing for reception feedback may raise various technical difficulties. The following methods and systems address such difficulties.

Unicast communications represent an example of peer-to-peer (PTP) communications, e.g., directed from a base station, such as the base station 102 to a single UE, such as the UE 106. By contrast, MBS communications represent an example of single-cell peer-to-multiple (PTM) communications, e.g., with a single base station, such as the base station 102, communicating with multiple UEs, such as the UEs 106A-106N. In some MBS scenarios, the base station 102 may broadcast a message to all UEs capable of receiving it. In other MBS scenarios, the base station 102 may multicast a communication by addressing the communication to a plurality or defined group of UEs.

Figures 5, 6:
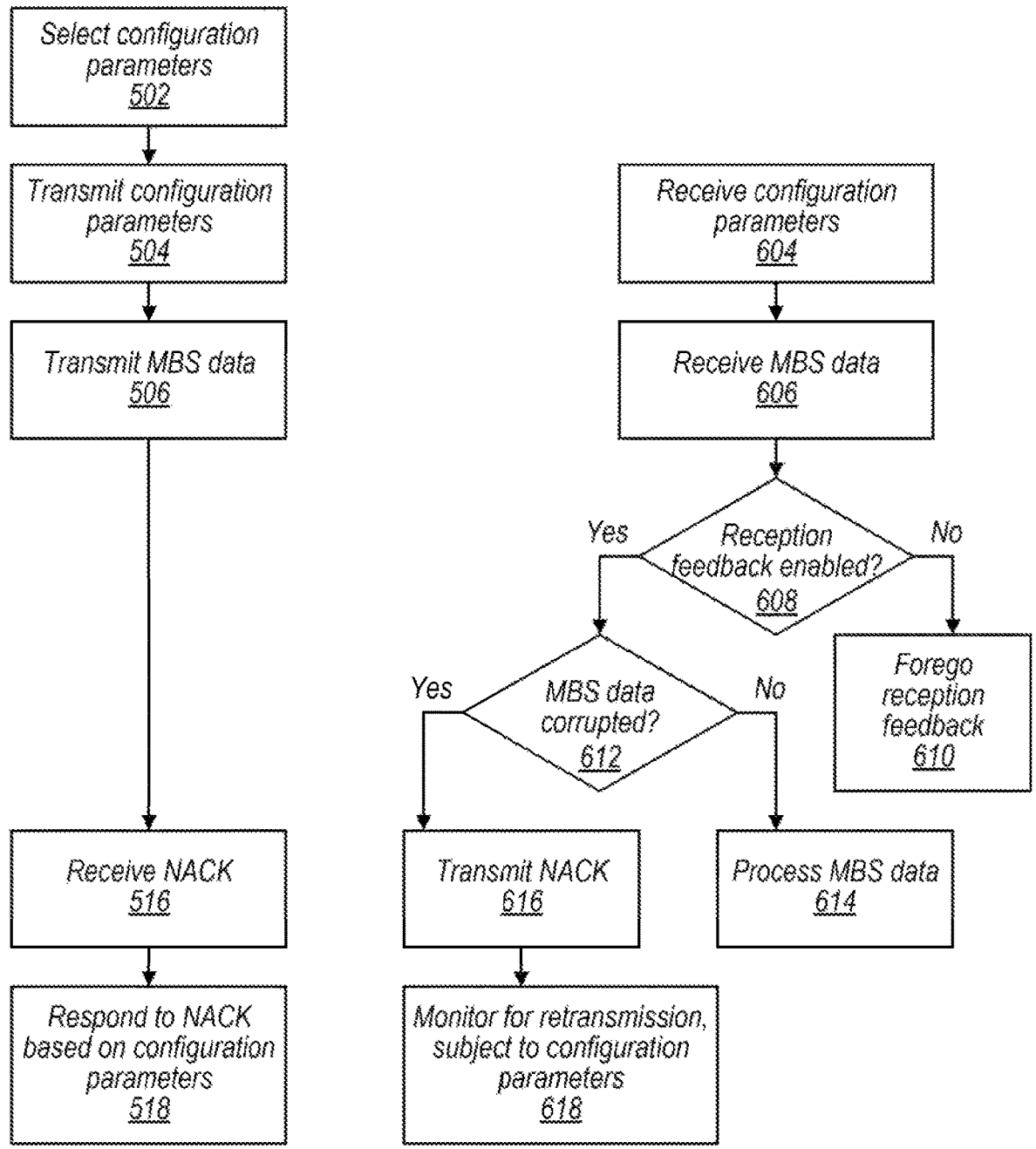
FIG. 5 illustrates a flow diagram for an example method for managing MBS reception feedback, by a base station, according to some embodiments.
FIG. 6 illustrates a flow diagram for an example method for providing MBS reception feedback, by a UE, according to some embodiments.

At a high level, reception feedback, such as HARQ-ACK, operates to confirm receipt of a message. For example, if the base station 102 transmits a message to the UE 106, the UE 106 may respond with an acknowledgement (ACK) message if the message was successfully received and/or with a negative-acknowledgement (NACK) message if the message was corrupted, distorted, or otherwise not successfully received. In response to a NACK, the base station 102, may, in some scenarios, retransmit the original message, or a similar message containing relevant data from the original message.

Where the base station 102 transmits an MBS message, e.g., a PTM message to a group of UEs 106A-N, reception feedback, such as ACK/NACK messages from the various UEs may introduce notable congestion and/or risk of collision. Additionally, the base station 102 may have additional options in response to receiving to one or more NACK messages responsive to the MBS message. For example, in some scenarios, the base station 102 may respond to receiving one or more MBS NACK messages by retransmitting the original PTM message to the UEs 106A-N. In other scenarios, the base station 102 may respond to receiving one or more MBS NACK messages by retransmitting, the original message, or relevant portions thereof, as a PTP message to the UE that transmitted the MBS NACK message. In some scenarios, the base station 102 may receive multiple MBS NACK messages from multiple UEs, and may respond by transmitting a respective PTP message to each of the UEs from which an MBS NACK message was received. In some scenarios, e.g., in high-congestion environments, reception feedback and/or retransmission of MBS messages may be undesirable. Thus, in the context of MBS communications, additional signaling and control procedures may be beneficial, beyond those so previously utilized for unicast feedback control FIGS. 6-5—Methods for Providing Reception Feedback for MBS Communications FIGS. 5-6 illustrate example methods for managing various aspects of reception feedback for MBS communications. FIG. 5 illustrates a flow diagram for an example method for managing MBS reception feedback, according to some embodiments. The method of FIG. 5 may be performed by a base station, such as the base station 102, or by some portion thereof, such as the processor(s) 404, the radio 430, and/or the communication chain 432. FIG. 6 illustrates a flow diagram for an example method for providing MBS reception feedback, according to some embodiments. The method of FIG. 6 may be performed by a UE, such as the UE 106A, or by some portion thereof, such as the radio circuitry 330. In some scenarios, the method of FIG. 6 may be performed by the UE 106A, while operating in RRC_CONNECTED mode.

In some scenarios, the method of FIG. 5 and the method of FIG. 6 may be synchronized, such that the base station 102 performs the method of FIG. 5 concurrently with the UE 106A performing the method of FIG. 6. However, it should be understood that the base station 102 and the UE 106A are separate entities, and each may operate independent of the other. For example, the base station 102 may, in some scenarios, operate according to the method of FIG. 5, in communication with a UE operation according to a method other than that shown in FIG. 6; and the UE, 106A may, in some scenarios, operate according to the method of FIG. 6, in communication with a base station operating according to a method other than that shown in FIG. 5.

As illustrated in FIG. 5, the base station 102 may, at 502, select configuration parameters pertaining to MBS reception feedback. In particular, the base station 102 may select configuration parameters pertaining to MBS HARQ-ACK protocols for a particular MBS service. In some scenarios, selecting the configuration parameters may be based partially or entirely on one or more determinations made by the base station 102. In some scenarios, selecting the configuration parameters may be based on an instruction received from another network entity.

As one example of such a configuration parameter, the base station may, in some implementations, select whether to enable or disable MBS reception feedback (e.g., HARQ-ACK feedback) for the MBS service. This determination may be based on one or more factors, such as cell congestion reception quality, and/or various other factors. In other implementations, the base station 102 may not have the option to disable MBS reception feedback.

As another example, the base station 102 may select parameters for retransmission of an MBS data communication (e.g., a payload communication of the MBS service) in the event that the base station 102 receives an MBS NACK message from one or more tips in response to an initial transmission of the MBS data communication. For example, in some scenarios, the base station 102 may select a parameter to cause the base station 102 to, in response to receiving an MBS NACK message from one or more UEs, retransmit the original MBS data communication to the original group of recipients. The base station 102 may select this option, e.g., in conditions in which the base station 102 expects to commonly receive MBS NACK messages from multiple UEs, or in conditions in which the base station 102 may have difficulty in determining which UE transmitted an MBS NACK message, among other scenarios. As another example, in some scenarios, the base station 102 may select a parameter to cause the base station 102 to, in response to receiving an MBS NACK message from a UE, retransmit the original MBS, or relevant portions thereof, as a unicast communication addressed to the UE that transmitted the MBS NACK message. The base station 102 may select this option, e.g., in conditions in which the base station 102 expects only one (or few) identifiable UEs to transmit an MBS NACK message, among other scenarios. As yet another example, the base station 102 may select a parameter to cause the base station 102 to, in response to receiving an MBS NACK message from a UE, not retransmit (e.g., omit) the original MBS. The base station 102 may select this option, e.g., in conditions in which signal congestion is high and/or communication fidelity of the MBS service is not critical, among other scenarios. In some scenarios, the base station 102 may enable MBS reception feedback, e.g., to inform decisions regarding scheduling, communication parameters, etc., even though the base station 102 will not retransmit in response, to an MBS NACK.

At 504, the base station 102 may transmit some or all of the MBS configuration parameters selected at 502 to a plurality of UEs 106A-N, where the UEs 106A-N are recipients of the MBS service. The transmitting of 504 may include one or more than one transmission. For example, in some scenarios, the base station 102 may transmit an MBS configuration message that indicates the MBS configuration parameters. Alternatively, or additionally, the base station 102 may include indications of one or more MBS configuration parameters within an MBS data communications.

As an example, the base station 102 may transmit a message in which higher-layer signaling indicates whether MBS reception feedback is enabled or disabled for the MBS service. Alternatively, the indication of whether MBS reception feedback is enabled or disabled may be provided as a bit in a field (e.g., as HARQ-ACK usage field) in a downlink control information (DCI) format used for MBS scheduling. Alternatively, the indication of whether MBS reception feedback is enabled or disabled may be provided as a field in a medium access control (MAC) control element (CE), e.g., of the MBS physical downlink shared channel (PDSCH).

As another example, the base station 102 may transmit a message including an indication of the selected parameters for retransmission of an MBS data communication in response to an MBS NACK message. For example, the indication may be included in a DCI for MBS data scheduling. As another example, the indication may be included in a MAC CE. For example, a new MAC CE may be introduced, which may include the MBS identifier (ID) of the MBS service and the indication of the selected MBS retransmission parameters. As yet another example, the indication may be included in any of various other configuration or control fields, headers, etc.

In some scenarios, the indication of the selected MBS retransmission procedure may consist of a simile bit. For example, a value of "0" may indicate that the base station 102 will respond to an MBS NACK message by retransmitting the original MBS data communication, while a value of "1" may indicate that the base station 102 will respond to an MBS NACK message by transmitting a unicast message to the UE from which the MBS NACK message was received (or vice versa). In other scenarios, the indication of MBS retransmission procedure may include additional bits, e.g., to allow signaling of other options, such as to signal that the base station 102 will not retransmit in response to an MBS NACK message. In some scenarios, the indication of the selected MBS retransmission procedure may take another form, such as inclusion of an additional control field or other information.

As illustrated in FIG. 6, at 604 the UE 106A may receive from the base station 102 the transmitted configuration parameters. In this scenario, the UE 106A is one of the UEs 106A-N that are recipients of the MBS service.

At 506, the base station 102 may transmit an MBS data communication. The MBS data communication may include a data payload for the MBS service. In some scenarios, the MBS data communication may also indicate some or all of the selected MBS configuration parameters, such that 504 and 506 occur in the same transmission. In other scenarios, 504 and 506 may include different transmissions.

At 606, the UE 106A may receive from the base station 102 the MBS data communication. At 608, the UE 106A may determine whether MBS reception feedback is enabled for the MBS pertaining to the MBS data communication received at 606. This determination may be based on the configuration parameters received at 604. It should be understood that, functionally, this determination may be made either at this point or at some other point, such as upon reception of the configuration parameters at 604. In some implementations, e.g., in which MBS reception feedback cannot be disabled, this determination may be omitted from the method.

If the UE 106A determines at 608 that reception feedback is not enabled, then the UE 106A may, at 610, forgo performing reception feedback. For example, the UE may not perform further analysis regarding MBS reception feedback, and/or may not transmit MBS reception feedback regarding the MBS data communication received at 606.

If the UE 106A determines at 608 that reception feedback is enabled, then the UE 106A may, at 612, determine whether the MBS data communication received at 606 was corrupted. For example, the UE 106A may determine that the MBS data communication was corrupted if a checksum procedure or other reception verification procedure fails.

In response to determining that the MBS data communication was not corrupted, then the UE 106A may, at 614, proceed to process the received MBS data communication, e.g., by demodulating and decoding the communication, extracting, the payload data, etc. In some implementations, the UE 106A may transmit an MBS ACK message to the base station 102. However, in other implementations, the UE 106A may not transmit an MBS ACK message at 614. Specifically, in some implementations, the system may be configured to utilize only negative feedback (e.g., a NACK message), in the event of reception failure, and to not utilize positive feedback (e.g., an ACK message) in the event of successful reception. Such a configuration may reduce network traffic and may reduce power expenditure by the UE 106A.

In response to determining, at 612, that the MBS data communication was corrupted, the UE 106A may, at 616, transmit to the base station 102 an MBS NACK message.

At 516, the base station 102 may receive the MBS NACK message. It should be understood that, in a scenario in which no MBS NACK is transmitted by one of the UEs 106A-N, 516 and subsequent elements may be omitted. In some scenarios, if the base station 102 does not receive an MBS NACK from the UE 106A at 516, then the base station 102 may proceed as if the MBS data communication was received properly by the UE 106A, I.e., the base station 102 may determine that the UE 106A has properly received the MBS data communication in response to not receiving an MBS NACK from the UE 106A responsive to the MBS data communication.

The NACK message may be transmitted according to various formats.

As a first option, the NACK message may be transmitted via the PUCCH. For example, the NACK message may be transmitted using an ACK/NACK PUCCH resource specifically allocated for the MBS service. E.g., the ACK/NACK PUCCH resource may include a specific combination of time/frequency resources and/or format. In some implementations, the ACK/NACK PUCCH resource may be indicated or configured via radio resource control (RRC) messaging, such as in PUCCH-Config, e.g., at 604 or at some other point. In some implementations, all of the UEs 106A-N that receive the MBS service may use the same ACK/NACK PUCCH resource. E.g., all of the UEs 106A-N may transmit simultaneously on this resource. The base station 102 may detect the energy of the PUCCH, and may determine whether any of the UEs 106A-N has transmitted an MBS NACK. This option may be well suited to scenarios in which the base station 102 will respond to a NACK by retransmitting the original MBS data communication (as opposed to responding with one or more unicast transmissions). In other implementations, the UEs 106A-N may be organized in sub-groups, with a distinct ACK/NACK PUCCH resource configured for each sub-group. In this way, the base station may easily determine the subset of UEs from which the NACK was transmitted, and may respond to a NACK by retransmitting (e.g., as unicast communications) to only the applicable subset(s). One non-limiting example of an RRC information element (IE) structure for use in configuring a common PUCCH resource for an MBS service is as follows:

```
MBS-ConfigCommon ::= SEQUENCE {
....
MBS ID ::= SEQUENCE{
...
HARQ-ACK          ENUMERATED {enabled, disabled}
n1PUCCH-AN        PUCCH-ResourceId  OPTIONAL
... }
```

In another variant of the first option, the NACK message may be transmitted at 616 using an ACK/NACK PUCCH resource specifically allocated for the UE 106A. Thus, each of the UEs 106A-N may transmit a NACK (if applicable) using a distinct assigned resource. For example, the UE 106A may transmit the NACK at 616 via a PUCCH resource assigned by the base station 102 specifically for the UE 106A to provide reception feedback for an MBS service. As another example, the UE 106A may transmit the NACK via a PUCCH resource configured for unicast physical uplink shared channel (PUSCH). In that example, the resource to be used may be indicated by the base station 102, e.g., via a MAC CE included in an MBS PDSCH. For example, a new field (e.g., a 4-bit "PUCCH resource indicator" field) may be included in the MAC CE. One non-limiting example of an RRC information element (IE) structure for use in configuring a PUCCH resource allocated for the UE 106A for au MBS service is as follows:

```
MBS-Config ::= SEQUENCE {
....
MBS ID ::= SEQUENCE{
...
n1PUCCH-AN        PUCCH-ResourceId  OPTIONAL
HARQ-ACK          ENUMERATED {enabled, disabled}
... }
}
```

As a second option, the NACK message may be transmitted via the unicast PUSCH of the UE 106A. For example, if the PUCCH according to the first option would collide in time with the unicast PUSCH, then the UE 106A may instead transmit the MBS NACK in the PUSCH, and the PUCCH may be omitted (e.g., may not be transmitted). As one example, the MBS NACK may be included in a MAC CE of the unicast PUSCH. In some scenarios, the MAC CE may further include additional information, such as MCCH/MTCH reception statistics, or other statistics reporting, e.g., rates or numbers of successful or unsuccessful MBS communications received by the UE 106A. For example, the UE 106A may record the total number of MBS messages received and the number of corrupted MBS messages received for a certain time period (e.g., in connection with the applicable MBS service), and may report relevant information (e.g., the numbers, a ratio, etc.) periodically, or when the failure ratio meets a predetermined threshold. In some scenarios, such a MAC CE may be configured to include an MBS ID of the MBS service, one or more bits to communicate the MBS NACK, and/or a field indicating additional information, such as MCCH/MTCH reception statistics.

In another variant of the second option, one or more bit(s) representing the MBS NACK may be multiplexed on a HARQ-ACK field of the unicast PUSCH of the UE 106A. For example, the MBS NACK may be added as the least-significant-bit(s) (LSB) of the HARQ-ACK field, where the most-significant-bits (MSB) are occupied by unicast HARQ-ACK feedback for the UE 106A. In other examples, the bits may be ordered differently.

In some scenarios, other collisions may also need to be resolved or prevented. For example, if the UE 106A transmits the MBS NACK via the PUCCH, e.g., according to option 1, above, then there is a chance that this PUCCH for MBS may be provided for transmission in the same slot as a unicast PUCCH. This may be considered a collision, in that two PUCCHs may not be allowed in the same slot. In some scenarios, in response to detecting such a collision, the UE 106A may prioritize the unicast PUCCH transmission, and forego transmitting the MBS NACK. In other scenarios, the UE 106A may prevent such collisions, or may respond to detecting such a collision, by multiplexing one or more MBS NACK bits with the unicast HARQ-ACK bits of the unicast PUCCH. The PUCCH resource may be derived from the configured PUCCH resource set. In some implementations, the ordering of the unicast and MBS HARQ-ACK bits may be predefined; e.g., the LSB(s) may be used for HARQ-ACK for MBS. In some implementations, the ordering of the HARQ-ACK bits may be defined by the base station 102. For example, the base station 102 may provide a bitmap or other indication of expected ordering of the HARQ-ACK bits, e.g., at 504.

As another example, in some scenarios, the UE 106A may receive MBS data communications for more than one MBS service, in which case the UE 106A may have MBS reception feedback to report for more than one MBS data communication at the same time. In such scenarios, each MBS service may be associated with one MBS ID. In some implementations, such collisions may be resolved by selecting only one NACK message to transmit. For example, the UE 106A may transmit the NACK message for the MBS having the lowest (or highest) MBS ID, while omitting (e.g., not transmitting) the NACK message for other MBS services. As another example, the UE 106A. may determine which NACK message to transmit, e.g., based on design-specific factors. In other implementations, the HARQ-ACK bits for all MBS services may be multiplexed on the PUCCH. For example, the HARQ-ACK bits may be organized by MBS ID. If an MBS ID is defined for a as MBS service to which the UE 106 is not subscribed, then the UE 106 may indicate a NACK for the associated bit. In some scenarios, ACK/NACK message may be transmitted via the PUCCH resource allocated for the MBS service with the lowest (or highest) MBS ID. In some scenarios, the PUCCH resource to be used may be selected in some other manner.

In some scenarios, the UE 106A may determine, e.g., at 612 or at some other time following 606, that the UE 106A is out of sync with the base station 102. In some implementations, the UE 106A may respond to this determination by triggering a physical random access channel (PRACH) procedure, to synchronize with the network, and may forego transmitting any MBS reception feedback (ACK or NACK responsive to the MBS data communication received at 606.

At 518, the base station 102 may respond to the MBS NACK received at 516. The response ma be based at least in part on the configuration parameters selected at 502. For example, if the selected parameters for retransmission of an MBS data communication indicate that the base station 102 will respond to an MBS NACK by, retransmitting the original MBS data communication, then responding at 518 to the MBS NACK may include retransmitting the original MBS data communication, e.g., addressed to the same set of UEs 106A-N as the original MBS data communication transmitted at 506. This retransmission may utilize resources allocated for the MBS service, such as a SC-MTCH, or other MBS downlink data channel.

As another example, if the selected parameters for retransmission of an MBS data communication indicate that the base station 102 will respond to an MBS NACK by transmitting a unicast message to the UE from which the MBS NACK message was received, then responding at 518 to the MBS NACK may include transmitting at least some portion of the original MBS data communication, but formatted as a unicast message addressed to the UE 106A. The unicast message may utilize resources allocated for unicast messaging to the UE 106A, such as a PDSCH, or other unicast downlink data channel. In some scenarios, the base station 102 may receive more than one MBS NACK message from more than one of the UEs 106A-N, and may respond by transmitting a respective unicast message to each of the UEs from which an MBS NACK message was received.

As yet another example, if the selected parameters for retransmission of an MBS data communication indicate that the base station 102 will not retransmit the MBS data communication in response to an MBS NACK message, then responding at 518 to the MBS NACK may include not retransmitting the MBS data communication. However, in this scenario, as well us in other scenarios, responding at 518 to the MBS NACK may further include additional tasks, such as storing a record of the MBS NACK message an/or additional information included in the MBS NACK message, such as MCCH/MTCH reception statistics. Responding at 518 may further include adjusting network parameters, etc., based on the MBS NACK message and/or associated information.

At 618, the UE 106A may monitor for retransmission of the MBS data communication, subject to the configuration parameters received at 606. For example, if the configuration parameters indicate that the base station 102 will respond to an MBS NACK by retransmitting the original MBS data communication, then the UE 106A may monitor appropriate resources allocated for the MBS service, such as the SC-MTCH, or other MBS downlink data channel. Monitoring the appropriate resources may include, e.g., placing appropriate hardware and/or software in an appropriate state for reception (e.g., a wake state) during a time window at which the appropriate resources are scheduled to be received. Monitoring the appropriate resources may further include receiving, demodulating, decoding, etc. signals received on those resources. Specifically, monitoring the appropriate resources may include receiving a retransmission of the MBS data communication.

As another example, the configuration parameters indicate that the base station 102 will respond to an MBS NACK by transmitting as unicast message to the UE from which the MBS NACK message was received, then the UE may monitor appropriate resources allocated for unicast messaging to the UE 106A, such as the PDSCH, or other unicast downlink data channel. Monitoring the appropriate resources may further include receiving, demodulating, decoding, etc. signals received on those resources. Specifically, monitoring the appropriate resources may include receiving a transmission of the at least a portion of the MBS data communication, retransmitted as a unicast message addressed to the UE 106A.

As yet another example, if the configuration parameters indicate that the base station 102 will not retransmit the MBS data communication in response to an MBS NACK message, then the UE 106A may not monitor resources to receive such a retransmission.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating, a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, Where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a base station to:
select a retransmission procedure for a multicast and broadcast services (MBS) service, from a plurality of available retransmission procedures;
transmit, to a plurality of user equipments (UEs), an indication of the selected retransmission procedure;
transmit, to the plurality of UEs, an MBS data communication for the MBS service;
receive, from a first UE of the plurality of UEs, a negative-acknowledgement (NACK) message responsive to the MBS data communication, wherein the NACK message is received using physical uplink control channel (PUCCH) resources allocated to the first UE for reception feedback for unicast messages received by the first UE; and
respond to the received NACK message based on the selected retransmission procedure, wherein responding to the received NACK message includes:
when the selected retransmission procedure is a first procedure, retransmitting the MBS data transmission using resources allocated for the MBS service; and
when the selected retransmission procedure is a second procedure, retransmitting the MBS data communication using resources allocated for unicast transmission to the first UE.

2. The apparatus of claim 1, wherein responding to the received NACK message includes:
when the selected retransmission procedure is a third procedure, not retransmitting the MBS data communication.

3. The apparatus according to claim 1, wherein the NACK message is received via physical uplink control channel (PUCCH) resources allocated for the MBS service.

4. The apparatus according to claim 3, wherein the processor is configured to cause the base station to:
receive an additional NACK message from a second UE of the plurality of UEs, wherein the additional NACK message is received via the same PUCCH resources allocated for the MBS service.

5. The apparatus according to claim 3, wherein the PUCCH resources are allocated for MBS reception feedback by a sub-group of the plurality of UEs, wherein the first UE is included in the sub-group.

6. The apparatus according to claim 1, wherein the NACK message is transmitted using physical uplink control channel (PUCCH) resources allocated to the first UE for reception feedback for MBS messages received by the first UE.

7. The apparatus according to claim 1, wherein the NACK message is transmitted using a unicast physical uplink shared channel (PUSCH).

8. The apparatus according to claim 1, wherein the processor is configured to cause the base station to:
receive from the UE reception statistics regarding messages associated with the MBS service received by the UE.

9. The apparatus according to claim 1, wherein the indication of the selected retransmission procedure is transmitted in a downlink control indicator (DCI) for MBS data scheduling.

10. The apparatus according to claim 1, wherein the indication of the selected retransmission procedure is transmitted in a medium access control (MAC) control element (CE).

11. A method for managing multicast and broadcast services (MBS) reception feedback, the method comprising:
transmitting, to a plurality of UEs subscribed to an MBS service, an MBS data communication for the MBS service;
receiving, from a first UE of the plurality of UEs, a negative-acknowledgement (NACK) message responsive to the MBS data communication, wherein the NACK is received via physical uplink control channel (PUCCH) resources allocated for MBS reception feedback by a sub-group of the plurality of UEs, wherein the first UE is included in the sub-group; and
in response to receiving the NACK, retransmitting the MBS data communication using resources allocated for unicast transmission to UEs of the sub-group of the plurality of UEs.

12. The method of claim 11, wherein the NACK message is received via physical uplink control channel (PUCCH) resources allocated for the MBS service, the method further comprising:
receiving an additional NACK message from a second UE of the plurality of UEs, wherein the additional NACK message is received via the same PUCCH resources allocated for MBS reception feedback by the sub-group of the plurality of UEs.

13. The method according to claim 11, wherein the PUCCH resources allocated for MBS reception feedback by a sub-group of the plurality of UEs are indicated by radio resource control (RRC) messaging.

14. An apparatus comprising:
a processor configured to cause a user equipment (UE) to:
receive, from a base station, a multicast and broadcast services (MBS) data transmission pertaining to an MBS service;
transmit, to the base station, a negative acknowledgement (NACK) message in response to determining that reception of the MBS data transmission was corrupted, wherein the NACK message is transmitted using an ACK/NACK physical uplink control channel (PUCCH) resource allocated for common use by UEs subscribed to the MBS service; and
monitor for a retransmission of the MBS data transmission responsive to the NACK message, wherein the monitoring includes:
when an indication provided by the base station of an MBS retransmission procedure has a first value, monitoring resources allocated for MBS communications; and
when the indication of the MBS retransmission procedure has a second value, monitoring resources allocated for unicast communications to the UE.

15. The apparatus of claim 14, wherein the indication of the MBS retransmission procedure is received in one of:
a downlink control indicator (DCI) for MBS data scheduling; or
a medium access control (MAC) control element (CE).

16. The apparatus according to claim 14, wherein the processor is configured to cause the UE to:
not transmit an acknowledgement (ACK) message in response to determining that the MBS data transmission was received properly.

* * * * *